US007756012B2

(12) United States Patent  
Abdulla et al.

(10) Patent No.: US 7,756,012 B2  
(45) Date of Patent: Jul. 13, 2010

(54) INTELLIGENT FAILOVER IN A LOAD-BALANCED NETWORK ENVIRONMENT

(75) Inventors: Ayaz Abdulla, Sunnyvale, CA (US); Norman K. Chen, Sunnyvale, CA (US); Anand Rajagopalan, Saratoga, CA (US); Ashutosh K. Jha, Sunnyvale, CA (US); Hemamalini Manickavasagam, San Jose, CA (US); Sameer Nanda, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 395 days.

(21) Appl. No.: 11/750,980

(22) Filed: May 18, 2007

(65) Prior Publication Data

US 2008/0285472 A1    Nov. 20, 2008

(51) Int. Cl.
*G01R 31/08* (2006.01)
*G06F 11/00* (2006.01)
*G08C 15/00* (2006.01)
*H04J 1/16* (2006.01)

(52) U.S. Cl. .................................... 370/216; 370/242
(58) Field of Classification Search ................ 370/242, 370/216, 217, 218, 219, 230, 235, 225
See application file for complete search history.

(56) References Cited

U.S. PATENT DOCUMENTS

| | | | |
|---|---|---|---|
| 5,508,997 A | 4/1996 | Katou | |
| 5,600,638 A | 2/1997 | Bertin et al. | |
| 5,724,510 A | 3/1998 | Arndt et al. | |
| 5,864,535 A | 1/1999 | Basilico | |
| 5,914,938 A | 6/1999 | Brady et al. | |
| 6,052,733 A | 4/2000 | Mahalingam et al. | |
| 6,151,297 A | 11/2000 | Congdon et al. | |
| 6,208,616 B1 | 3/2001 | Mahalingam et al. | |
| 6,512,774 B1 * | 1/2003 | Vepa et al. | 370/401 |
| 6,560,630 B1 | 5/2003 | Vepa et al. | |
| 6,567,377 B1 | 5/2003 | Vepa et al. | |

(Continued)

OTHER PUBLICATIONS

Office Action. U.S. Appl. No. 11/750,919. Dated Jun. 12, 2009.

(Continued)

*Primary Examiner*—Derrick W Ferris  
*Assistant Examiner*—Maharishi Khirodhar  
(74) *Attorney, Agent, or Firm*—Patterson & Sheridan, LLP (57) ABSTRACT

A hash table in the network device driver maintains data on the traffic characteristics for each network interface ("NIC") within a computing device. If one of the NICs in the computing device becomes unreliable, the cost function in the hash engine allows the software driver to initiate network traffic redistribution among the remaining reliable NICs in the computing device. Using this hash engine, the software driver is able to intelligently redirect each of the network connections on an unreliable NIC to a reliable NIC within the computing device, in a way that optimizes the distribution of network traffic across the remaining reliable NICs. Alternatively, if a connection is moved from an old NIC to a new NIC, the software driver can detect the moved connection and offload the moved connection to a hardware offload engine on the new NIC. With this approach, issues such as network interface overloading and computing device performance degradation may be more easily avoided when failing over network connections, thereby improving overall system performance relative to prior art techniques.

22 Claims, 6 Drawing Sheets

U.S. PATENT DOCUMENTS

| | | | |
|---|---|---|---|
| 6,570,875 | B1 | 5/2003 | Hegde |
| 6,590,861 | B1 | 7/2003 | Vepa et al. |
| 6,683,882 | B1 | 1/2004 | Maufer et al. |
| 6,687,758 | B2 | 2/2004 | Craft et al. |
| 6,779,039 | B1 | 8/2004 | Bommareddy et al. |
| 6,938,092 | B2 | 8/2005 | Burns |
| 7,116,664 | B2 | 10/2006 | Davis et al. |
| 7,299,294 | B1 | 11/2007 | Bruck et al. |
| 7,324,512 | B2 | 1/2008 | Larson et al. |
| 7,415,028 | B1 | 8/2008 | Allam |
| 2001/0056503 | A1 | 12/2001 | Hibbard |
| 2006/0010238 | A1* | 1/2006 | Craft et al. .................. 709/227 |
| 2006/0083227 | A1 | 4/2006 | Eldar |
| 2006/0171303 | A1 | 8/2006 | Kashyap |
| 2006/0206611 | A1 | 9/2006 | Nakamura |
| 2007/0002738 | A1 | 1/2007 | McGee |
| 2007/0025253 | A1 | 2/2007 | Enstone et al. |
| 2007/0201490 | A1 | 8/2007 | Mahamuni |
| 2008/0022148 | A1 | 1/2008 | Barnea et al. |
| 2008/0056246 | A1 | 3/2008 | McGee et al. |
| 2009/0222558 | A1 | 9/2009 | Xu et al. |
| 2010/0008251 | A1 | 1/2010 | Bender et al. |

OTHER PUBLICATIONS

Office Action. U.S. Appl. No. 11/305,177. Dated Aug. 6, 2009.
Office Action. U.S. Appl. No. 11/750,914. Dated Jun. 29, 2009.
Office Action. U.S. Appl. No. 11/750,984. Dated Jun. 24, 2009.
Office Action. U.S. Appl. No. 11/750,987. Dated Jun. 17, 2009.
Office Action. U.S. Appl. No. 11/750,903. Dated Jun. 22, 2009.
Final OA, U.S. Appl. No. 11/750,919 dtd Dec. 24, 2009.
Final Office Action, U.S. Appl. No. 11/305,177 dtd. Mar. 2, 2010.
Final Office Action, U.S. Appl. No. 11/750,914 dtd. Feb. 19, 2010.

* cited by examiner

INTELLIGENT FAILOVER IN A LOAD-BALANCED NETWORK ENVIRONMENT

BACKGROUND OF THE INVENTION

1. Field of the Invention

Embodiments of the present invention relate generally to network communications and more specifically to a system and method for intelligently failing over network connections in a load-balanced networking environment.

2. Description of the Related Art

Performance and reliability are key requirements for modern computer networks. When a network interface ("NIC") on a computing device is no longer reliable, the networking performance of that NIC may drop substantially, possibly to zero. In such situations, contemporary solutions redirect network connections from the unreliable NIC to other, reliable NICs on the same computing device, a technique referred to as "failover." Although failover may mitigate the immediate problem of the existence of an unreliable NIC, the additional network traffic on the remaining reliable NICs from the failed-over connections may cause one or more of the remaining reliable NICs to become overloaded, thereby reducing the performance of those interfaces. Additionally, the additional network traffic on the remaining reliable NICs may substantially increase the network processing performed by the computing device, thereby reducing the performance of the computing device.

As the foregoing illustrates, what is needed in the art is a technique for failing over network connections to one or more reliable NICs that reduces the likelihood of NIC overloading or other phenomena that can impair overall system performance.

SUMMARY OF THE INVENTION

One embodiment of the present invention sets forth a method for offloading a network connection from a host software module to a first hardware offload engine included in a failover network interface card (NIC) in a switch-independent network environment. The method includes the steps of requesting the identity of the failover NIC, determining the identity of the failover NIC from the output of a hash algorithm, setting an entry in a first delegated connection table included in the first hardware offload engine, where the entry includes connection state for the network connection, and setting a hardware identifier in a connection table included in the host software module that corresponds to the network connection, where the set hardware identifier indicates that the network connection is being run through the first hardware offload engine.

One advantage of the disclosed method is that issues such as network interface overloading may be more easily avoided when failing over network connections, thereby improving overall system performance relative to prior art techniques

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Intelligent failover of network connections from a failed NIC to one or more operational NICs may be accomplished by using a hash engine that tracks network statistics, including the number of connections and amount of transmitted and received traffic through each NIC in a switch-independent (i.e., a network environment in which a switch coupling the NICs of computing device 100 to an external network is not operating in an 802.3ad mode) network environment. Once a failed or unreliable NIC has been detected, the hash engine is queried for an alternative NIC that may be underutilized or otherwise able to accommodate the connections from the failed NIC. Such a query allows one or more additional network connections to be handled by the alternative NIC without exceeding the capacity of that NIC, thereby avoiding a failover operation that may substantially reduce the network performance of the computing device associated with the NICs. Additional network performance benefits may be realized by unoffloading the connections from the hardware offload engine within a failed NIC and subsequently offloading those connections to the hardware offload engine(s) within one or more failover NICs.

In another embodiment of the invention, the selection of a failover NIC is performed external to the computing device, potentially by a switch in a switch-dependent (i.e., a network environment in which a switch coupling the NICs of computing device 100 to an external network is operating in an 802.3ad mode) network environment or by an external computing device in a switch-independent network environment. Since the process for selecting a failover NIC in this embodiment differs from that for selecting a NIC in switch-independent environments, this embodiment is considered separately. In addition, since the benefits from offloading a network connection from a software TCP/IP (Transmission Control Protocol & Internet Protocol) stack to a hardware offload engine are well known to those skilled in the art, these issues will not be discussed herein.

Figure 1A:
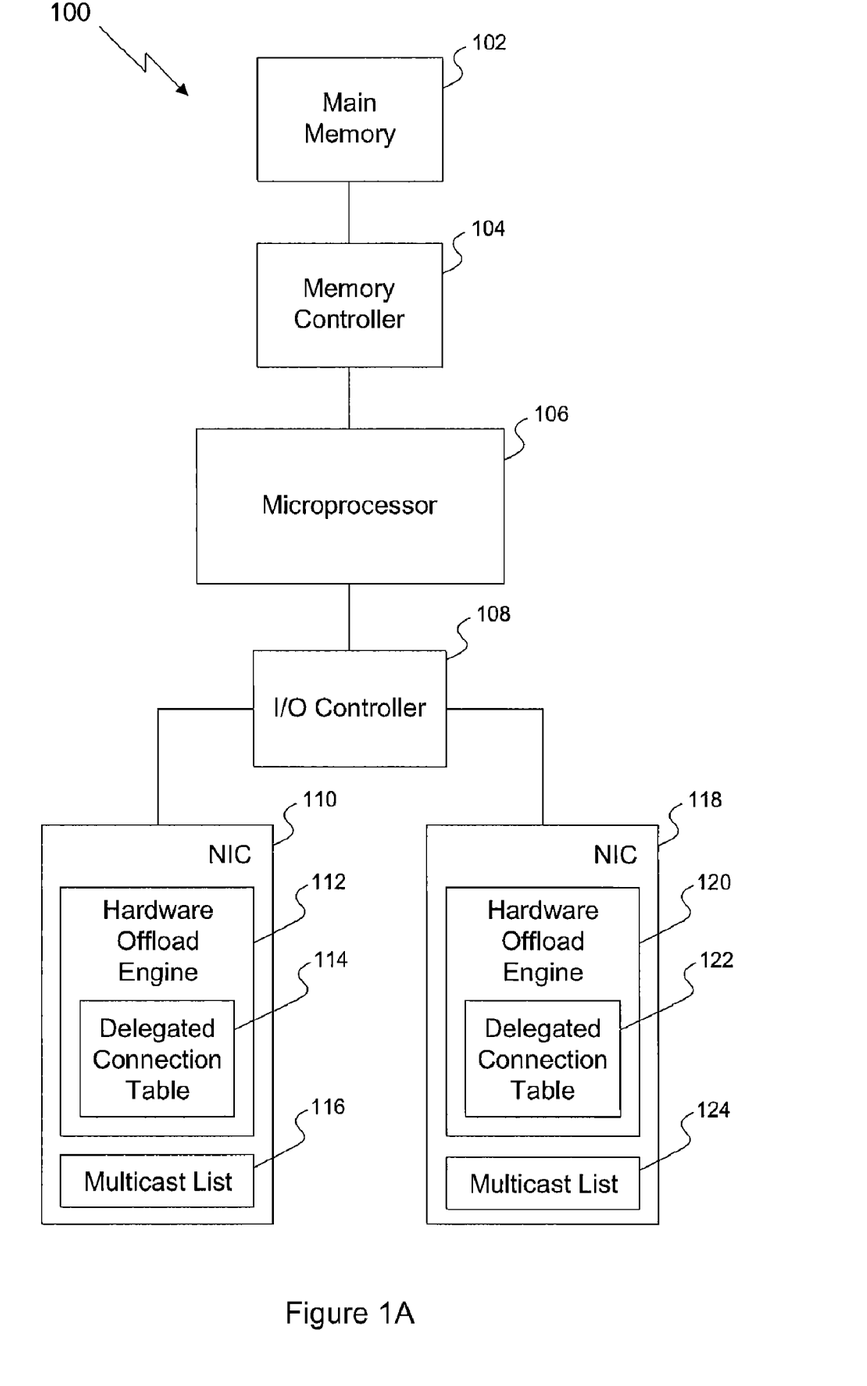
FIGS. 1A and 1B illustrate a computing device in which one or more aspects of the present invention can be implemented.
Figure 1B:
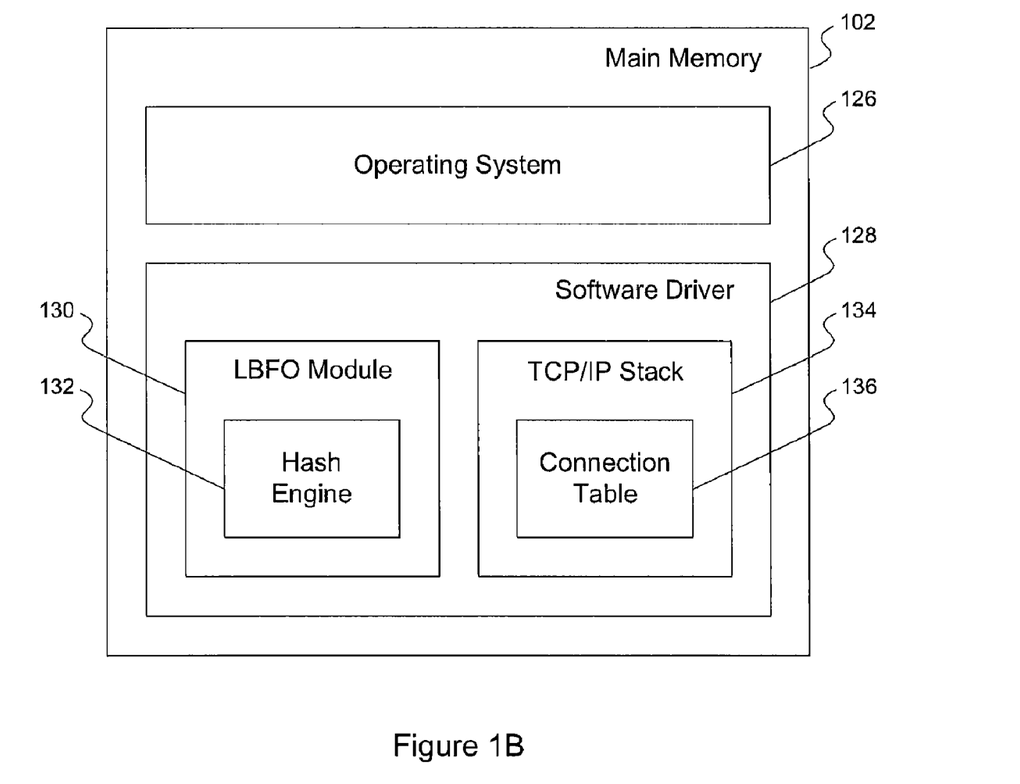

FIGS. 1A and 1B illustrate a computing device 100 in which one or more aspects of the present invention can be implemented. As shown, the computing device 100 includes a main memory 102, a memory controller 104, a microprocessor 106, an I/O controller 108, and NICs 110, 118. NIC 110 includes a multicast list 116 and a hardware offload engine ("HOE") 112, which further includes a delegated connection table ("DCT") 114. NIC 118 includes a multicast list 124 and an HOE 120, which further includes a DCT 122. HOEs 112, 120 include logic configured for processing network frames associated with network connections between the computing device 100 and one or more remote network computing devices (not shown) that have been selectively offloded to NICs 110, 118. By processing network frames with logic in the NICs 110, 118 (sometimes referred to as "handling connections in hardware") rather than performing those processing functions in a host software TCP/IP stack (sometimes referred to as "handling connections in software") as is conventionally done, communications between the NICs 110, 118 and the microprocessor 106 as well as computations performed by the microprocessor 106 may be substantially reduced.

DCTs 114,122 are configured to include a plurality of delegated connection table entries, where each entry corresponds to a network connection whose frames are processed by the HOE that includes that particular DCT. In one embodiment of the invention, each DCT entry includes the following state information for each delegated connection: destination (i.e., remote computing device) internet protocol ("IP") address, destination port number, source (computing device 100) port number, and certain TCP/IP connection state necessary to run the delegated connection in hardware.

The memory controller 104 is coupled to the main memory 102 and to the microprocessor 106, and the I/O controller 108 is coupled to the microprocessor 106 and the NICs 110,118. In one embodiment of the invention, the microprocessor 106 transmits commands or data to the NICs 110,118 by writing commands or data into the I/O controller 108. Once such commands or data are written into the I/O controller 108, the I/O controller 108 optionally translates the commands or data into a format that the target NIC may understand and communicates the commands or data to the target NIC. Similarly, NICs 110,118 transmit commands or data to the microprocessor 106 by writing commands or data into the I/O controller 108, and the I/O controller 108 optionally translates the commands or data into a format that the microprocessor 106 may understand and communicates the commands or data to the microprocessor 106. The aforementioned couplings may be implemented as memory busses or I/O busses, such as PCI™ busses, or any combination thereof, or may otherwise be implemented in any other technical feasible manner.

As shown in more detail in FIG. 1B, the main memory 102 includes an operating system 126 and a software driver 128. The software driver 128 includes a Load Balancing and Failover ("LBFO") module 130 and a TCP/IP stack 134. LBFO module 130 tracks networking status for each NIC (e.g., by monitoring the link status of each NIC, the number of send and receive errors on each NIC and/or whether each NIC is sending and receiving keep-alive packets) and communicates with the TCP/IP stack 134 when network traffic is being moved from a failed NIC to software or from software to a failover NIC. The LBFO module 130 includes a hash engine 132, which intelligently determines how network connections should be distributed across the different functional NICs in the computing device 100, based on the aforementioned networking statistics, as described in the related U.S. patent application titled, "Intelligent Failback In a Load-Balanced Networking Environment," filed on May 18, 2007 and having Ser. No. 11/750,914 and attorney docket number NVDA/P001882. This related patent application is hereby incorporated herein by reference. The TCP/IP stack 134 includes a connection table 136, which includes a plurality of connection table entries, where each entry corresponds to a network connection between the computing device 100 and a remote computing device. In one embodiment, each connection table entry includes the following state information for each connection: the destination IP address, destination port number, source IP address, source port number and a hardware identifier for the connection as well as enough TCP/IP state to handle dropped packets and the like. Importantly, the hardware identifier for a particular connection indicates which HOE, if any, is processing that connection in hardware.

In one embodiment, the connection state for each connection being handled in hardware may be routinely copied from the delegated connection table within the HOE charged with processing the connection to the connection table 136. For example, the state information may be copied using a repeating timer. In this fashion, an updated copy of the connection state for each delegated connection may be maintained in the connection table 136 for use by the TCP/IP stack 134.

The computing device 100 may be a desktop computer, server, laptop computer, palm-sized computer, personal digital assistant, tablet computer, game console, cellular telephone, or any other type of similar device that processes information.

Figure 2:
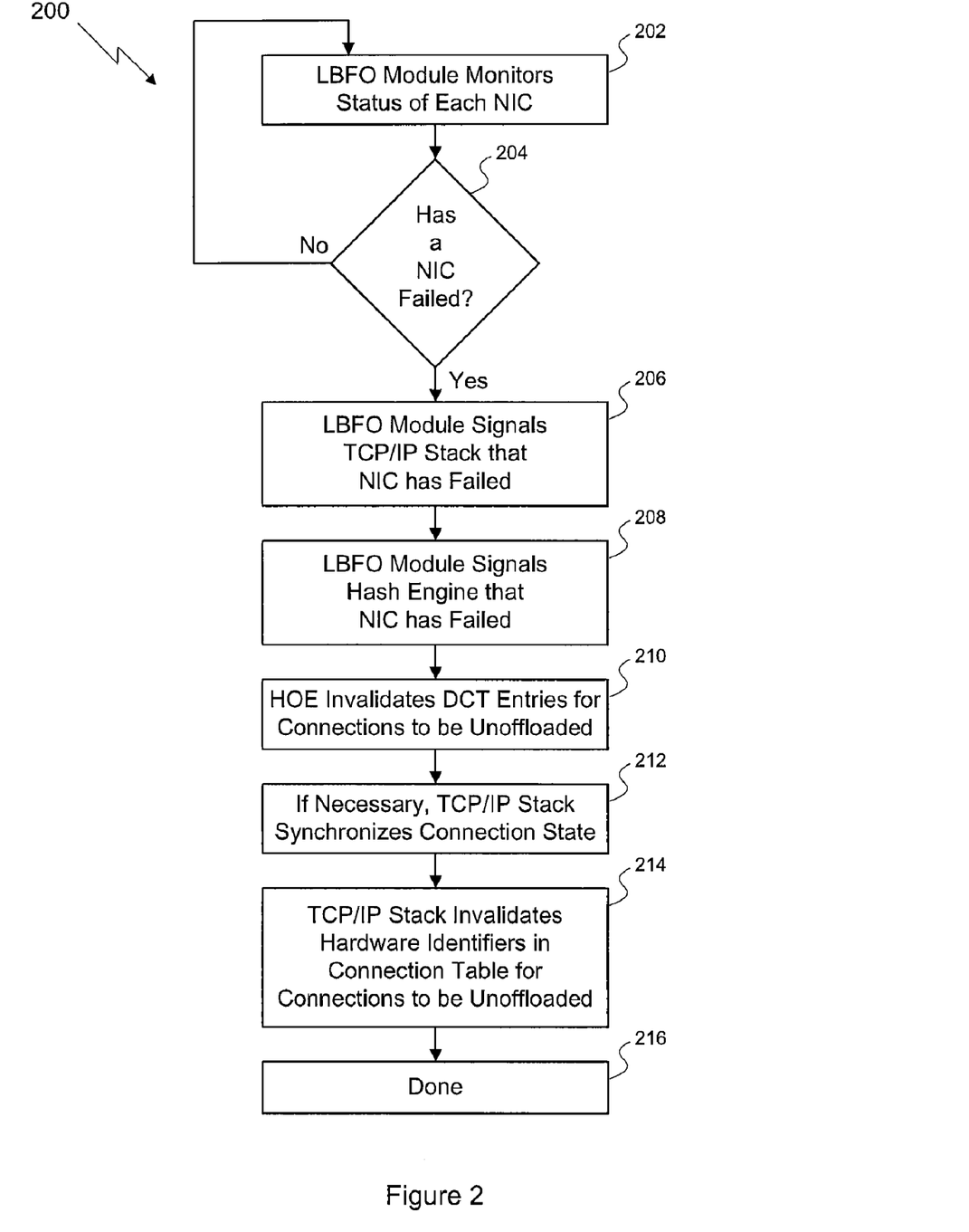
FIG. 2 illustrates a flowchart of method steps for unoffloading network connections from a failed NIC to software.

FIG. 2 illustrates a flowchart of method steps 200 for unoffloading network connections from a failed NIC to software, according to one embodiment of the invention. Although the method is described in reference to the computing device 100, persons skilled in the art will understand that any system configured to perform the method steps, in any order, is within the scope of the present invention.

As shown, the method for unoffloading network connections begins at step 202, where the LBFO module 130 monitors the status of each NIC 110, 118 for an indication that one of the NICs has either failed or become unreliable. In one embodiment, a NIC is determined to have failed or become unreliable when any of three conditions are present. First, the LBFO module 130 may determine that there is a link disconnection for the NIC, suggesting that a network cable has become disconnected, based on the link indication for that NIC. Second, the LBFO module 130 may determine that a substantial number or percentage of packets transmitted by the NIC were lost, based on a comparison between the number of packets sent by the NIC and the number of packets acknowledged by the remote computing devices to which the packets were transmitted. Third, the LBFO module 130 may determine that keep-alive packets transmitted between the NICs 110, 118 in the computing device 100 are being lost. As described in the related U.S. patent application titled, "Technique for Identifying a Failed Network Interface Card within a Team of Network Interface Cards," filed on Dec. 15, 2005 and having Ser. No. 11/303,285 and attorney docket number NVDA/P001879, the failed NIC can be identified based on how each NIC is transmitting and/or receiving the keep-alive packets. This related patent application is hereby incorporated herein by reference. By monitoring each NIC for these types of indications, the LBFO module 130 is capable of reliably detecting a failed or unreliable NIC.

In step 204, the LBFO module 130 determines whether a NIC has failed or become unreliable based on the indications being monitored in step 202. If the LBFO module 130 determines that no failure has occurred, then the method returns to step 202, where the LBFO module 130 continues monitoring the NICs 110, 118 for a failure.

If, however, a NIC is found to have failed or become unreliable, the method proceeds to steps 206-214, where the connections being run through that NIC are unoffloaded to software. For purposes of discussion only, it is assumed that NIC 110 has failed. In step 206, the LBFO module 130 signals the TCP/IP stack 134 that NIC 110 has failed or has become unreliable. In step 208, the LBFO module signals the hash engine 132 that NIC 110 has failed or has become unreliable to avoid having any new connections assigned to the failed NIC 110. Upon receiving this signal, the hash engine 132 adjusts its internal load balancing algorithm so that new connections are not assigned to the failed NIC 110.

In step 210, for each connection being run through the failed NIC 110, the HOE for the failed NIC (e.g., HOE 112)

invalidates the entry in the DCT (e.g., DCT 114) corresponding to its connection. In one embodiment, the DCT entry is invalidated by the TCP/IP stack 134 sending a command to the HOE 112 to invalidate the DCT entry, the HOE 112 receiving the command and invalidating the DCT entry, and the HOE 112 acknowledging the completion of this operation to the TCP/IP stack 134. In step 212, for each connection being unoffloaded from the failed NIC 110, if the connection state in the DCT 114 for that connection does not match the connection state in the connection table 136, then the TCP/IP stack 134 copies the connection state for the connection from the DCT 114 to the connection table 136. In step 214, for each connection being unoffloaded from the failed NIC 110, the TCP/IP stack 134 invalidates the hardware identifier for that connection in the connection table 136. Invalidating the hardware identifier indicates that the connection is being run through the TCP/IP stack 134. Importantly, once the connection state for a connection has been invalidated in the DCT 114 and the hardware identifier for the connection has been invalidated in the connection table 136, any packets transmitted or received on that connection are handled thereafter in software through the TCP/IP stack 134, rather than in hardware, through the HOE 112. Once all connections on the failed NIC 110 have been unoffloaded from hardware to software in this fashion, the method terminates in step 216.

Figure 3A:
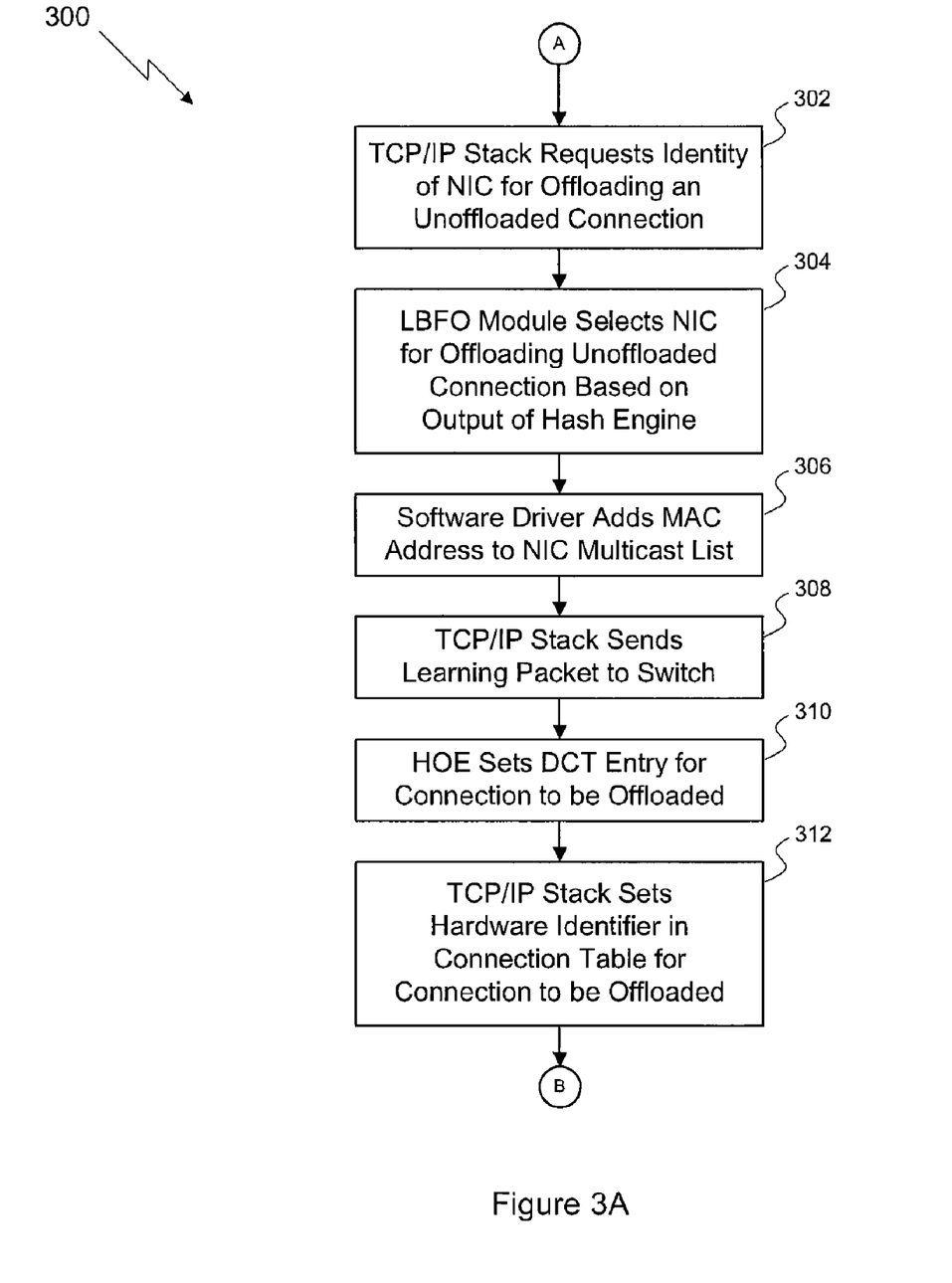
FIGS. 3A and 3B illustrate a flowchart of method steps for offloading network connections from software to a failover NIC in a switch-independent network environment.
Figure 3B:
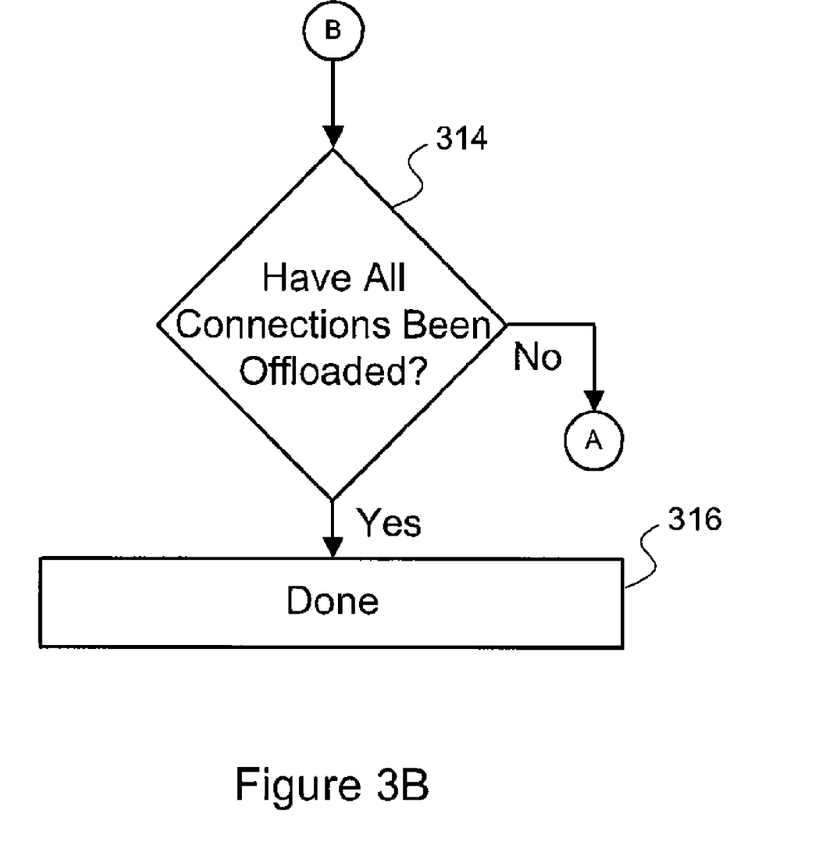

FIGS. 3A and 3B illustrate a flowchart of method steps for offloading network connections from software to a failover NIC in a switch-independent network environment, according to one embodiment of the invention. Although the method is described in reference to the computing device 100, persons skilled in the art will understand that any system configured to perform the method steps, in any order, is within the scope of the present invention. Importantly, in a switch-independent network environment, the LBFO module 130 identifies a failover NIC for each connection unoffloaded to software, as described above in FIG. 2.

As shown, the method for offloading a single network connection from software to a failover NIC is described in steps 302-312. These steps are repeated for each connection unoffloaded to software in method 200 such that all unoffloaded connections are eventually offloaded from software to one or more failover NICs. In step 302, the TCP/IP stack 134 requests the LBFO module 130 to identify a NIC to which the current unoffloaded connection should be offloaded. Again, as discussed in step 208, the hash engine 132 tracks the status of each NIC in the computing device 100 and adjusts its connection assignment algorithm when a NIC fails or becomes unreliable to avoid having any new or existing connections offloaded to that failed or unreliable NIC. In step 304, the LBFO module 130 queries the hash engine 132 to identify a suitable NIC to which the current connection should be offloaded. For purposes of discussion only, it is assumed that the hash engine 132 identifies the failover NIC 118 as the NIC to which the current connection (which had previously been unoffloaded from the failed NIC 110) should be offloaded.

In step 306, the software driver 128 adds the MAC address of the failed NIC 110 to the multicast list 124 of the failover NIC 118, which allows the failover NIC 118 to receive packets addressed to the MAC address of the failed NIC 110. In step 308, the TCP/IP stack 134 directs the failover NIC 118 to send a learning packet to the switch. The learning packet may be any technically feasible packet type that includes the MAC address of the failed NIC 110. As is well-known, sending such a packet from the failover NIC 118 causes the switch to reconfigure itself to route subsequent packets destined for the MAC address of the failed NIC 110 to the failover NIC 118. Thus, all network traffic related to the current connection being offloaded to the failover NIC 118 is thereafter received by the failover NIC 118. As described in greater detail in the related patent application having attorney docket no. NVDA/P001882, a consequence of this approach is that all connections from a particular failed NIC are offloaded to the same failover NIC.

In step 310, HOE 120 sets the connection state in the DCT 122 corresponding to the current connection being offloaded. Again, setting the connection state in a DCT entry includes setting its destination IP address, destination port number, the source port number and certain TCP/IP state for the connection being offloaded. In one embodiment, the DCT entry is set by the TCP/IP stack 134 sending a command to the HOE 120 to set the connection state, the HOE 120 receiving the command and setting the connection state, and the HOE 120 acknowledging the completion of this operation to the TCP/IP stack 134. In step 312, for the connection being offloaded, the TCP/IP stack 134 sets the hardware identifier within the connection table 136 to a device handle that represents the HOE 120 of the failover NIC 118. The hardware identifier indicates that the connection is being run through the HOE 120. Importantly, once the hardware identifier for a connection is set to a device handle for a particular HOE, any packets transmitted or received on that connection are handled thereafter in hardware through that HOE.

In step 314, the TCP/IP stack 134 determines whether all unoffloaded connections for the failed NIC 110 have been offloaded to a failover NIC. If all unoffloaded connections have not been offloaded to a failover NIC, the method returns to steps 302-312, where another unoffloaded connection is offloaded to a failover NIC. If, however, all unoffloaded connections have been offloaded to a failover NIC, the method terminates in step 316.

Figure 4:
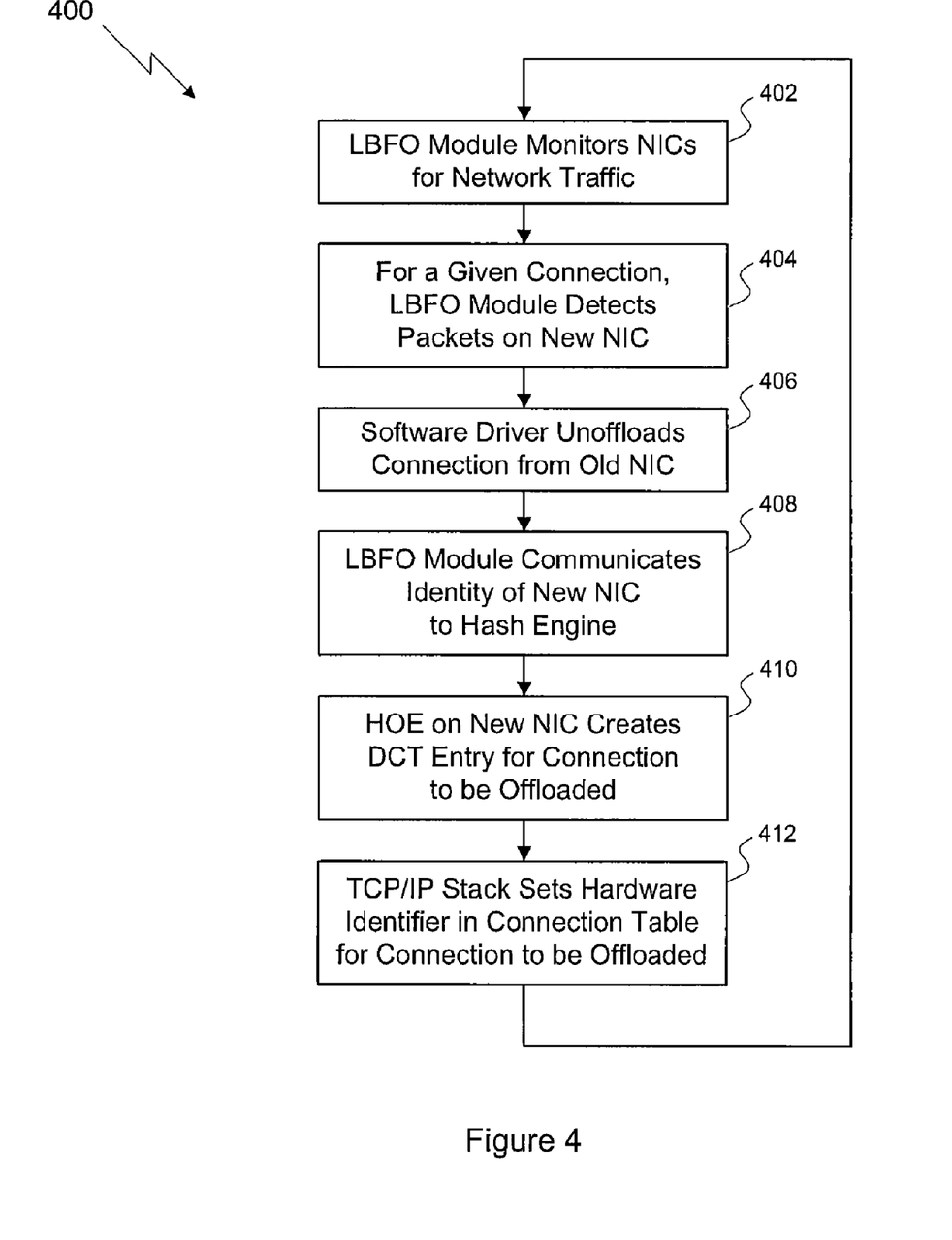
FIG. 4 illustrates a flowchart of method steps for offloading a network connection to a new NIC when the network connection is moved to the new NIC by external means.

FIG. 4 illustrates a flowchart of method steps for offloading a network connection to a new NIC when the network connection is moved to the new NIC by external means, according to one embodiment of the invention. Although the method is described in reference to the computing device 100, persons skilled in the art will understand that any system configured to perform the method steps, in any order, is within the scope of the present invention.

As previously described, failover can occur when a connection is moved from an old NIC to a new NIC (i.e., the failover NIC) in at least two situations. One situation involves a switch-dependent network environment, in which a switch determines that a NIC has failed or has become unreliable and therefore moves some or all connections associated with the failed or unreliable NIC to one or more failover NICs. Another situation involves a switch-independent network environment, where the packets received for a connection by the computing device 100 are addressed to and received by a NIC (i.e., the new/failover NIC) other than the old NIC. Here, some computing device in the network other than computing device 100 has taken the initiative to transmit packets associated with the connection to the new NIC. In both situations, the LBFO module 130 recognizes that a new NIC has been selected for a connection when the LBFO module 130 detects that packets for the connection are being received on a NIC other than the old NIC. As described in greater detail below, the LBFO module 130 monitors the NICs for incoming packets, determines whether incoming packets indicate a moved connection, unoffloads the moved connection from the old NIC, and offloads the moved connection on the new NIC. For purposes of discussion only, it is assumed that NIC 110 is the old NIC.

As shown, the method for offloading a network connection begins at step 402, where the LBFO module 130 monitors the NICs for network traffic, as described above. In step 404, for a given connection, the LBFO module 130 detects that packets for the connection have been received on a new NIC rather than on the old NIC 110. Again, this may occur in at least two situations. The first is where, in a switch-dependent network environment, the switch detects a failed or unreliable NIC and moves the connection to a failover NIC. The second is where, in a switch-independent network environment, a computing device starts sending packets for a connection to a NIC other than the old NIC, on which the packets for the connection were initially received. For purposes of discussion only, it is assumed that the new NIC identified in step 404 is NIC 118. In step 406, the software driver 128 unoffloads the connection from the old NIC 110 to software, as previously described above with respect to FIG. 2.

In step 408, the LBFO module 130 communicates the identity of the new NIC 118 to the hash engine 132, which causes the hash engine 132 to update its internal data structures for the additional connection on the new NIC 118. In step 410, HOE 120 sets the connection state in the DCT 122 corresponding to the connection being offloaded to NIC 118. Again, setting the connection state in a DCT entry includes setting its destination IP address, destination port number, the source port number and certain TCP/IP state for the connection being offloaded. In one embodiment, the DCT entry is set by the TCP/IP stack 134 sending a command to the HOE 120 to set the connection state, the HOE 120 receiving the command and setting the connection state, and the HOE 120 acknowledging the completion of this operation to the TCP/IP stack 134. In step 412, for the connection being offloaded, the TCP/IP stack 134 sets the hardware identifier within the connection table 136 to a device handle that represents the HOE 120 of the new NIC 118, before returning to step 402. Again, the hardware identifier indicates that the network connection is being run through the HOE 120. As previously described herein, once the hardware identifier for a connection is set to a device handle for a particular HOE, any packets transmitted or received on that connection are handled thereafter in hardware through that HOE.

One should note that after a connection associated with an old NIC 110 has been unoffloaded to software pursuant to method 200, but before the connection is offloaded to a new NIC pursuant to method 400, the computing device 100 may transmit packets for this connection from software on a NIC temporarily selected by the hash engine 132. In general, the selection of a temporary NIC is performed by the LBFO engine 130 querying the hash engine 132 for a NIC whose current transmit performance is at a level such that transmitting the packets associated with an additional connection would not substantially degrade the transmit performance for the existing connections on that NIC. Once the LBFO engine 130 detects that a packet associated with the unoffloaded connection being run out of software has been received on a new NIC, as described above, the transmission of packets for this connection on the temporary NIC is discontinued and the connection is offloaded to the new NIC, for transmit and receive packets, pursuant to method 400.

One advantage of the disclosed method is that using a hash engine to intelligently distribute network traffic among the different functional NICs in the computing device 100, when failing over connections in switch-independent network environment, may substantially improve network performance relative to prior art solutions. Another advantage of the disclosed method is that offloading a network connection to a failover NIC when the network connection is moved to the failover NIC may substantially improve computing device performance relative to prior art solutions.

While the foregoing is directed to embodiments of the present invention, other and further embodiments of the invention may be devised without departing from the basic scope thereof. The scope of the present invention is determined by the claims that follow.

We claim:

1. A method for offloading a network connection from a host software module to a first hardware offload engine included in a failover network interface card (NIC), the method comprising:
    monitoring packets being received by a plurality of functional NICs, wherein packets associated with the network connection are being received by a first NIC in the plurality of functional NICs;
    detecting that a packet associated with the network connection has been received by a second NIC in the plurality of functional NICs and identifying the second NIC as the failover NIC;
    communicating the identity of the failover NIC to a hash engine that runs a hash algorithm used to determine the identities of failover NICs;
    setting an entry in a first delegated connection table included in the first hardware offload engine, wherein the entry includes connection state for the network connection; and
    setting a hardware identifier in a connection table included in the host software module that corresponds to the network connection, wherein the set hardware identifier indicates that the network connection is being run through the first hardware offload engine.

2. The method of claim 1, wherein the network connection is established in a switch-dependent network environment, and the switch stops transmitting packets associated with the network connection to the first NIC and starts transmitting packets associated with the network connection to the second NIC.

3. The method of claim 1, wherein the network connection is established in a switch-independent network environment, and an external computing device stops transmitting packets associated with the network connection to the first NIC and starts transmitting packets associated with the network connection to the second NIC.

4. The method of claim 1, wherein the network connection is a Transmission Control Protocol and Internet Protocol (TCP/IP) connection, and the host software module is a TCP/IP stack.

5. The method of claim 1, further including the steps of unoffloading the network connection from a second hardware offload engine included in the first NIC.

6. The method of claim 5, further comprising the step of determining the identity of a temporary transmission NIC from the output of the hash algorithm.

7. The method of claim 6, further comprising the step of transmitting a packet via the temporary transmission NIC.

8. The method of claim 7, further comprising the step of discontinuing packet transmissions via the temporary transmission NIC upon detecting that a packet associated with the network connection has been received by the second NIC.

9. The method of claim 5, wherein the step of unoffloading the network connection from the second hardware offload engine included in the first NIC includes:
    detecting and signaling that the first NIC has failed or become unreliable;
    informing a hash engine that runs the hash algorithm that the first NIC has failed or become unreliable;

invalidating an entry in a second delegated connection table included in the second hardware offload engine, wherein the entry includes connection state for the network connection; and invalidating the hardware identifier in the connection table included in the host software module that corresponds to the network connection, wherein the invalidated hardware identifier indicates that the network connection is being run through the host software module.

10. The method of claim 9, wherein the step of unoffloading the network connection from the second hardware offload engine further includes the step of synchronizing the connection state for the network connection in the entry in the second delegated connection table and the connection state for the network connection in the connection table included in the host software module.

11. The method of claim 10, wherein the network connection is a Transmission Control Protocol and Internet Protocol (TCP/IP) connection, and the host software module is a TCP/IP stack.

12. A computing device configured to offload a network connection from a networking protocol module to a first hardware offload engine included in a failover network interface card (NIC), the computing device comprising:

a plurality of NICs that includes the failover NIC;

a host processor; and a host memory coupled to the host processor configured to store a software driver having a load balancing failover (LBFO) module that includes a hash engine and the networking protocol module that includes a connection table, wherein:

the LBFO module is configured to monitor packets being received by a plurality of functional NICs, wherein packets associated with the network connection are being received by a first NIC in the plurality of functional NICs, the LBFO module is further configured to detect that a packet associated with the network connection has been received by a second NIC in the plurality of functional NICs and to identify the second NIC as the failover NIC, the LBFO module is further configured to communicate the identity of the failover NIC to the hash engine, which runs a hash algorithm used to determine the identities of failover NICs, and to the networking protocol module, upon learning the identity of the failover NIC, the networking protocol module is configured to cause the first hardware offload engine to set an entry in a first delegated connection table included in the first hardware offload engine, wherein the entry includes connection state for the network connection, and the networking protocol module is further configured to set a hardware identifier in the connection table that corresponds to the network connection, wherein the set hardware identifier indicates that the network connection is being run through the first hardware offload engine.

13. The computing device of claim 12, wherein the network connection is established in a switch-dependent network environment, and the switch stops transmitting packets associated with the network connection to the first NIC and starts transmitting packets associated with the network connection to the second NIC.

14. The computing device of claim 12, wherein the network connection is established in a switch-independent network environment, and an external computing device stops transmitting packets associated with the network connection to the first NIC and starts transmitting packets associated with the network connection to the second NIC.

15. The computing device of claim 12, wherein the network connection is a Transmission Control Protocol and Internet Protocol (TCP/IP) connection, and the networking protocol module is a TCP/IP stack.

16. The computing device of claim 12, wherein the network connection has been unoffloaded from a second hardware offload engine included in the first NIC.

17. The computing device of claim 16, wherein the LBFO module is configured to determine the identity of a temporary transmission NIC from the output of the hash algorithm executed by the hash engine.

18. The computing device of claim 17, wherein one or more packets are transmitted via the temporary transmission NIC.

19. The computing device of claim 18, wherein the LBFO module is configured to discontinue packet transmissions via the temporary transmission NIC upon detecting that a packet associated with the network connection has been received by the second NIC.

20. The computing device of claim 16, wherein the step of unoffloading the network connection from the second hardware offload engine included in the first NIC includes:

the LBFO module is configured to detect that the first NIC has failed or become unreliable and to signal the networking protocol module that the first NIC has failed or become unreliable;

the LBFO module is further configured to inform the hash engine that the first NIC has failed or become unreliable;

the networking protocol module is configured to communicate to the second hardware offload engine to invalidate an entry in a second delegated connection table included in the second hardware offload engine, wherein the entry includes connection state for the network connection;

the second hardware offload engine is configured to invalidate the entry in the second delegated connection table in response to the communication from the networking protocol module; and the networking protocol module is further configured to invalidate the hardware identifier in the connection table that corresponds to the network connection, wherein the invalidated hardware identifier indicates that the network connection is being run through the networking protocol module.

21. The computing device of claim 20, wherein the networking protocol module is further configured to synchronize the connection state for the network connection in the entry in the second delegated connection table and the connection state for the network connection in the connection table.

22. The computing device of claim 10, wherein the network connection is a Transmission Control Protocol and Internet Protocol (TCP/IP) connection, and the networking protocol module is a TCP/IP stack.

* * * * *